United States Patent [19]

Johansson

[11] 3,739,214

[45] June 12, 1973

[54] DEVICE FOR CLAMPING A WINDING BAR IN TANGENTIAL DIRECTION

[75] Inventor: Torbjorn Johansson, Vasteras, Sweden

[73] Assignee: Allmanna Svenska Elektriska Aktiebolaget, Vasteras, Sweden

[22] Filed: Nov. 1, 1971

[21] Appl. No.: 194,314

[30] Foreign Application Priority Data

Nov. 2, 1970 Sweden.............................. 14727/70

[52] U.S. Cl. .................................................. 310/214
[51] Int. Cl. ............................................... H02k 3/48
[58] Field of Search ................... 310/214, 215, 216, 310/217, 218, 213

[56] References Cited
UNITED STATES PATENTS

| 1,320,126 | 10/1919 | Dudley | 310/214 |
| 3,621,315 | 11/1971 | Dalmo | 310/214 |
| 3,158,770 | 11/1964 | Coggeshall | 310/214 |
| 2,819,514 | 1/1958 | Polard | 310/214 |

FOREIGN PATENTS OR APPLICATIONS

| 1,208,805 | 1/1966 | Germany | 310/214 |

Primary Examiner—R. Skudy
Attorney—Jennings Bailey, Jr.

[57] ABSTRACT

A winding bar is clamped in a tangential direction in a winding slot in a rotating machine, which is also provided with an axially directed slot wedge arranged at the opening of the slot, by providing a radially directed positioning groove in one of the slot walls with a wedge device in this groove exerting pressure on the winding bar. The wedge device comprises two side wedges, which may be connected into a single unit, and which have sliding surfaces facing each other converging in tangential and radial directions and engaging an intermediate wedge which can be inserted in the radial direction between the two side wedges.

2 Claims, 6 Drawing Figures

Patented June 12, 1973  3,739,214

INVENTOR.
TORBJORN JOHANSSON
BY

DEVICE FOR CLAMPING A WINDING BAR IN TANGENTIAL DIRECTION

BACKGROUND OF THE INVENTION

1. Field of the Invention

The present invention relates to a device for clamping a winding bar in the tangential direction in a winding slot of a rotating machine which is also provided with an axially directed slot wedge arranged at the opening of the slot. The device comprises at least one radially directed positioning groove in one of the slot walls and a wedge device placed in this groove and exerting pressure on said winding bar.

2. The Prior Art

With large AC machines, for example machines dimensioned for 50 MVA and above, it has sometimes been found that a conventional slot wedge device does not clamp the coil sides arranged in the winding slots sufficiently firmly.

It is known through German Pat. No. 1,208,805 to provide a machine with additional clamping means in the form of two cooperating, radially directed wedges, the sliding surfaces of which run parallel to an axial plane, and which are arranged in a radially directed positioning groove in the slot wall.

The known device has certain disadvantages. For instance, it is difficult to obtain a reliable estimate of the forces operating on the conductor by measuring the recovery force on the wedge device since a relatively large proportion of this force is used to counteract frictional forces. Furthermore, the wedge device is scarcely suitable from the standardizing point of view since wedges having varying wedge angles must be provided for the various conductor levels which may occur.

Furthermore, the relatively small wedge angle means that a convenient variation of the device according to the width of the coils in a machine is only possible within relatively narrow limits.

SUMMARY OF THE INVENTION

A device according to the invention offers a considerable reduction in the above-mentioned drawbacks.

The characteristic of the invention is that a winding bar is clamped in a tangential direction in a winding slot in a rotating machine, which is also provided with an axially directed slot wedge arranged at the opening of the slot, by providing a radially directed positioning groove in one of the slot walls with a wedge device in this groove exerting pressure on the winding bar. The wedge device comprises two side wedges, which may be connected into a single unit, and which have sliding surfaces facing each other converging in tangential and radial directions and engaging an intermediate wedge which can be inserted in the radial direction between the two side wedges.

BRIEF DESCRIPTION OF THE DRAWING

In the following the invention will be described with reference to the accompanying drawings in which.

DESCRIPTION OF THE PREFERRED EMBODIMENTS

Figure 1:
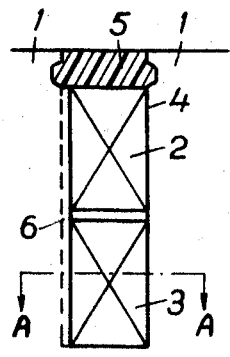
FIG. 1 shows in radial section a winding slot provided with a positioning groove according to the invention and FIG. 2 shows the same slot in a section along the line A — A in FIG. 1, provided with a device according to the invention.
Figure 2:
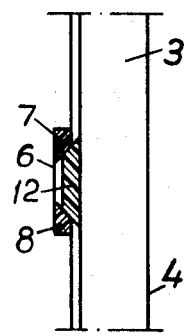

In the drawings 1 designates stator teeth in an AC generator and 2 and 3 are winding bars arranged in an intermediate winding slot 4, the bar 2 being an upper coil side and the bar 3 a lower coil side. The two winding bars are clamped in the radial direction by means of an axially positioning slot wedge 5.

The slot 4 is provided with a plurality of radial positioning grooves 6 in at least one of the slot walls. The slot walls lying in the radial plane support the side wedges 7 and 8 which are flexibly connected to each other in order to form a yokelike, yielding body 9. The wedges 7 and 8 have sliding surfaces 10a and 10b which converge both in the radial and in the tangential direction. These wedge surfaces are intended to cooperate with corresponding wedge surfaces 11a and 11b of an intermediate wedge 12 which is intended to be pressed between a coil side and the yoke-shaped body 9.

Figure 3:
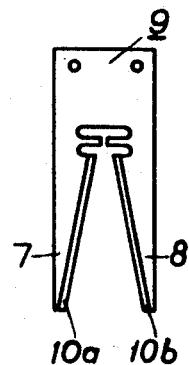
FIGS. 3 and 5 show two different embodiments of wedge pairs intended to be clamped in the positioning groove.
Figures 4, 4A:
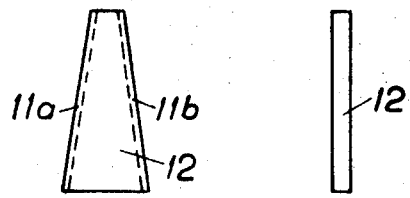
FIG. 4 shows a tangential view of a wedge intended to cooperate with such a wedge pair and FIG. 4a the wedge in axial view.

The wedge pair shown in FIG. 3 is intended to be clamped by only one coil side. When the lowermost coil side is to be clamped in a winding slot, for example the coil side 3 in FIG. 1, the wedge 12 is arranged first in a positioning groove 6. After this the yoke-shaped body 9 is pressed down into the positioning groove with the wedge ends first. Normally the wedge device formed by the wedges 7, 8 and 12 is self-blocking, but as an extra precaution it may be ensured that a tight mechanical connection is obtained between the yoke-shaped body 9 and the slot wedge 5, for instance by arranging a number of inserts in the upper part of the positioning groove or by adjusting the length of the yoke.

When the upper coil side 4 is to be clamped, the yoke-shaped body is first inserted into the positioning groove with the wedge ends directed towards the air gap, after which the wedge 12 is pressed in in radial direction.

Figure 5:
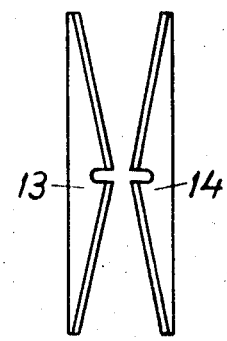

According to another embodiment of the invention, the two double wedges 13 and 14 shown in FIG. 5 are used instead of the yoke-shaped body 9. Each double wedge consists of two wedges arranged radially one after the other and joined together by a narrow waist. Such wedges provide a firm clamp for all the conducting bars in the winding slot by means of one and the same positioning groove.

If a plurality of positioning grooves with their wedge devices are arranged with different axial positions and evenly distributed over both walls of a winding slot, an elastic deformation of the coil sides is possible if successive parts of a coil side are subjected alternately to positive and negative bending moments. This provides an extremely elastic clamping of the coil sides in the slot.

The wedges shown in the drawings and intended for the positioning groove are preferably made of insulating material.

I claim:

1. In a rotating machine having a winding slot (4) provided with an axially directed slot wedge (5) arranged at an opening of the slot, and having at least one radially directed positioning groove (6) in one of the slot walls, means for clamping a winding bar (3) in a tangential direction in said winding slot comprising a wedge device positioned in said groove and exerting pressure on a winding bar therein, said wedge device comprising two side wedges (7,8) arranged one against each wall of the positioning groove and an intermediate wedge (12) insertable in a radial direction between the two side wedges, the side wedges having sliding surfaces (10a, 10b) facing each other and said intermediate wedge having cooperating surfaces, said surfaces converging in tangential and radial directions.

2. In a rotating machine as claimed in claim 1, a yielding yoke-like body (9) connecting said side wedges flexibly one to the other.

* * * * *